United States Patent
Hulse et al.

(10) Patent No.: US 9,800,939 B2
(45) Date of Patent: Oct. 24, 2017

(54) VIRTUAL DESKTOP SERVICES WITH AVAILABLE APPLICATIONS CUSTOMIZED ACCORDING TO USER TYPE

(71) Applicant: Guest Tek Interactive Entertainment Ltd., Calgary (CA)

(72) Inventors: David Andrew Hulse, Athens (GR); Jason Thomas, Murray, UT (US); Thomas R. Duke, Edinburgh (GB)

(73) Assignee: Guest Tek Interactive Entertainment Ltd., Calgary (CA)

( * ) Notice: Subject to any disclaimer, the term of this patent is extended or adjusted under 35 U.S.C. 154(b) by 18 days.

(21) Appl. No.: 14/280,221

(22) Filed: May 16, 2014

(65) Prior Publication Data

US 2014/0250460 A1    Sep. 4, 2014

Related U.S. Application Data

(63) Continuation of application No. 12/473,086, filed on May 27, 2009, now Pat. No. 8,732,749.

(60) Provisional application No. 61/169,879, filed on Apr. 16, 2009.

(51) Int. Cl.
| | |
|---|---|
| H04N 7/173 | (2011.01) |
| H04N 21/4782 | (2011.01) |
| G06F 9/44 | (2006.01) |
| H04N 21/254 | (2011.01) |
| H04N 21/462 | (2011.01) |
| H04L 29/06 | (2006.01) |
| H04N 5/445 | (2011.01) |

(52) U.S. Cl.
CPC ....... *H04N 21/4782* (2013.01); *G06F 9/4445* (2013.01); *H04L 67/38* (2013.01); *H04N 21/254* (2013.01); *H04N 21/4622* (2013.01)

(58) Field of Classification Search
CPC ....... H04N 21/25808; H04N 21/25825; H04N 21/25833; H04N 21/25891; H04N 21/27; H04N 21/4516; H04N 21/4782; H04N 21/254; H04N 21/4622
USPC .................................................. 725/18, 19
See application file for complete search history.

(56) References Cited

U.S. PATENT DOCUMENTS

| | | | |
|---|---|---|---|
| 4,641,253 | A | 2/1987 | Mastran |
| 5,319,455 | A | 6/1994 | Hoarty |
| 5,412,720 | A | 5/1995 | Hoarty |
| 5,442,700 | A | 8/1995 | Snell et al. |

(Continued)

FOREIGN PATENT DOCUMENTS

| | | |
|---|---|---|
| CN | 1687893 A | 10/2005 |
| CN | 1913943 A | 2/2007 |

(Continued)

OTHER PUBLICATIONS

Office Action by SIPO dated Jul. 24, 2014 for Chinese Patent Application No. 200980159934.7 (Concise explanation of relevance attached).

(Continued)

*Primary Examiner* — Pankaj Kumar
*Assistant Examiner* — Reuben M Brown
(74) *Attorney, Agent, or Firm* — ATMAC Patent Services Ltd.; Andrew T. MacMillan (57) ABSTRACT

Methods and apparatus are described for providing access to arbitrary applications via an interactive television service using a pool of remote virtual desktops.

20 Claims, 3 Drawing Sheets

(56) References Cited

U.S. PATENT DOCUMENTS

| | | | |
|---|---|---|---|
| 5,485,197 A | 1/1996 | Hoarty | |
| 5,526,034 A | 6/1996 | Hoarty et al. | |
| 5,550,578 A | 8/1996 | Hoarty et al. | |
| 5,557,316 A | 9/1996 | Hoarty et al. | |
| 5,587,734 A | 12/1996 | Lauder et al. | |
| 5,594,507 A | 1/1997 | Hoarty | |
| 5,757,925 A | 5/1998 | Faybishenko | |
| 5,812,665 A | 9/1998 | Hoarty et al. | |
| 5,883,661 A | 3/1999 | Hoarty | |
| 5,926,647 A | 7/1999 | Adams et al. | |
| 6,034,678 A | 3/2000 | Hoarty et al. | |
| 6,049,823 A | 4/2000 | Hwang | |
| 6,055,315 A | 4/2000 | Doyle et al. | |
| 6,064,377 A | 5/2000 | Hoarty et al. | |
| 6,100,883 A | 8/2000 | Hoarty | |
| 6,198,822 B1 | 3/2001 | Doyle et al. | |
| 6,202,211 B1* | 3/2001 | Williams, Jr. | 725/78 |
| 6,205,582 B1 | 3/2001 | Hoarty | |
| 6,253,238 B1 | 6/2001 | Lauder et al. | |
| 6,263,346 B1 | 7/2001 | Rodriquez | |
| 6,301,616 B1 | 10/2001 | Pal et al. | |
| 6,305,020 B1 | 10/2001 | Hoarty et al. | |
| 6,463,459 B1 | 10/2002 | Orr et al. | |
| 6,571,245 B2 | 5/2003 | Huang et al. | |
| 6,600,496 B1 | 7/2003 | Wagner et al. | |
| 6,622,307 B1 | 9/2003 | Ho | |
| 6,738,382 B1 | 5/2004 | West et al. | |
| 6,907,574 B2 | 6/2005 | Xu et al. | |
| 6,941,382 B1 | 9/2005 | Tuli | |
| 6,996,073 B2 | 2/2006 | West et al. | |
| 7,103,099 B1 | 9/2006 | Paz et al. | |
| 7,188,353 B1* | 3/2007 | Crinon | 725/32 |
| 7,254,786 B2 | 8/2007 | Henriquez | |
| 7,580,376 B2 | 8/2009 | West et al. | |
| 7,589,737 B2 | 9/2009 | Hochmuth et al. | |
| 7,600,239 B2 | 10/2009 | De Lange et al. | |
| 7,747,086 B1 | 6/2010 | Hobbs et al. | |
| 8,045,557 B1 | 10/2011 | Sun et al. | |
| 8,209,717 B2 | 6/2012 | Pina | |
| 8,326,051 B1* | 12/2012 | Hobbs | H04N 1/4092 382/232 |
| 8,732,749 B2 | 5/2014 | Hulse et al. | |
| 8,854,195 B2 | 10/2014 | West et al. | |
| 2002/0109712 A1 | 8/2002 | Yacovone et al. | |
| 2002/0184630 A1 | 12/2002 | Nishizawa et al. | |
| 2003/0025722 A1 | 2/2003 | Cliff et al. | |
| 2003/0067554 A1 | 4/2003 | Klarfeld et al. | |
| 2003/0234819 A1 | 12/2003 | Daly et al. | |
| 2004/0024580 A1 | 2/2004 | Salmonsen et al. | |
| 2004/0090597 A1 | 5/2004 | De Haan | |
| 2005/0125835 A1 | 6/2005 | Wei | |
| 2005/0154736 A1* | 7/2005 | Meikleham | G06Q 30/00 |
| 2005/0256923 A1 | 11/2005 | Adachi | |
| 2005/0283791 A1 | 12/2005 | McCarthy et al. | |
| 2006/0117371 A1 | 6/2006 | Margulis | |
| 2006/0184614 A1 | 8/2006 | Baratto et al. | |
| 2006/0195884 A1 | 8/2006 | van Zoest et al. | |
| 2006/0206820 A1 | 9/2006 | Bullard et al. | |
| 2006/0230105 A1 | 10/2006 | Shappier et al. | |
| 2006/0230156 A1 | 10/2006 | Shappir et al. | |
| 2006/0277576 A1 | 12/2006 | Acharya et al. | |
| 2007/0073730 A1 | 3/2007 | Jun | |
| 2007/0174873 A1 | 7/2007 | Griggs | |
| 2007/0199019 A1 | 8/2007 | Angiolillo et al. | |
| 2007/0266123 A1 | 11/2007 | Johannesson | |
| 2007/0299976 A1 | 12/2007 | Zafar et al. | |
| 2008/0007559 A1 | 1/2008 | Kalaiah et al. | |
| 2008/0034029 A1 | 2/2008 | Fang et al. | |
| 2008/0170619 A1 | 7/2008 | Landau | |
| 2008/0170622 A1 | 7/2008 | Gordon et al. | |
| 2008/0178249 A1 | 7/2008 | Gordon et al. | |
| 2008/0186979 A1 | 8/2008 | Kolar | |
| 2008/0200154 A1 | 8/2008 | Maharajh et al. | |
| 2008/0201736 A1 | 8/2008 | Gordon et al. | |
| 2008/0212942 A1 | 9/2008 | Gordon et al. | |
| 2008/0215671 A1 | 9/2008 | Lu et al. | |
| 2008/0228865 A1 | 9/2008 | Cruzada | |
| 2009/0006537 A1 | 1/2009 | Palekar et al. | |
| 2009/0041118 A1 | 2/2009 | Pavlovskaia et al. | |
| 2009/0059962 A1 | 3/2009 | Schmidt et al. | |
| 2009/0080523 A1 | 3/2009 | McDowell | |
| 2009/0100125 A1 | 4/2009 | McDowell | |
| 2009/0100483 A1 | 4/2009 | McDowell | |
| 2009/0119365 A1 | 5/2009 | Tomic | |
| 2009/0172751 A1 | 7/2009 | Aldrey et al. | |
| 2009/0196346 A1 | 8/2009 | Zhang et al. | |
| 2009/0210817 A1 | 8/2009 | Schmeider et al. | |
| 2009/0313674 A1 | 12/2009 | Ludvig et al. | |
| 2009/0316709 A1 | 12/2009 | Polcha | |
| 2009/0328109 A1 | 12/2009 | Pavlovskaia et al. | |
| 2010/0031347 A1 | 2/2010 | Ohto | |
| 2010/0064335 A1 | 3/2010 | Jenkin et al. | |
| 2010/0082681 A1 | 4/2010 | Adimatyam et al. | |
| 2010/0106766 A1 | 4/2010 | Bailey et al. | |
| 2010/0111410 A1 | 5/2010 | Lu et al. | |
| 2010/0118972 A1 | 5/2010 | Zhang et al. | |
| 2010/0138476 A1 | 6/2010 | Gokaraju et al. | |
| 2010/0158109 A1 | 6/2010 | Dahlby et al. | |
| 2010/0191551 A1 | 7/2010 | Drance et al. | |
| 2011/0126227 A1 | 5/2011 | Corvin | |
| 2011/0157196 A1 | 6/2011 | Nave et al. | |
| 2011/0179106 A1 | 7/2011 | Hulse et al. | |
| 2012/0030706 A1 | 2/2012 | Hulse et al. | |
| 2014/0059597 A1 | 2/2014 | Issa et al. | |
| 2014/0331219 A1* | 11/2014 | Gorti | 717/170 |

FOREIGN PATENT DOCUMENTS

| | | |
|---|---|---|
| CN | 101022398 A | 8/2007 |
| CN | 101083714 A | 12/2007 |
| EP | 1135722 A4 | 6/2005 |
| WO | 99/17549 A1 | 4/1999 |
| WO | 00/07091 A1 | 2/2000 |
| WO | 2008088741 A2 | 7/2008 |
| WO | 2008088772 A9 | 12/2008 |
| WO | 2009099895 A1 | 8/2009 |
| WO | 2009155214 A2 | 12/2009 |
| WO | 2010041267 | 4/2010 |
| WO | 2010044926 A2 | 4/2010 |
| WO | 2010054136 A2 | 5/2010 |

OTHER PUBLICATIONS

International Search Report and Written Opinion of the International Searching Authority dated Apr. 30, 2010 (PCT/US2009/045996).

European Search Report and Opinion dated Apr. 21, 2011, EP Application No. 11150981.6.

T. Richardson, "The RFB Protocol", Version 3.3, pp. 1-26, retrieved from the Internet: URL: http://grox.net/doc/apps/vnc/rfbproto.pdf, dated Jan. 2998.

F. Lamberti, et al., "A Streaming-based Solution for Remote Visualization of 3d Graphics on Mobile Devices", IEEE Transactions on Visualization and Computer Graphics, vol. 13, No. 2, Mar./Apr. 2007.

F. Richardson, et al. "Virtual Network Computing", IEEE Internet Computing, IEEE Service Center, New York, New York, vol. 2, No. 1, Jan. 1, 1998.

Australian Office Action dated Feb. 15, 2012, AU Application No. 2011200152.

P.N. Tudor, et al., "Read-Time Transcoding of MPEG-2 Video Bit Streams", BBC R&D IBC (1997) Amsterdam.

R. Kurceren, et al., "Compressed Domain Video Editing,", ICASSP, IEEE, 2006.

International Search Report and Written Opinion of the International Searching Authority dated Feb. 21, 2012, International application No. PCT/US2011/044688.

Extended European search report including search opinion for corresponding app. 11812960.0 at EPO; dated Jan. 22, 2014.

Australian Notice of Acceptance, dated Jun. 18, 2014, App No. 2009344302.

(56) References Cited

OTHER PUBLICATIONS

English translation of First Office Action and Search Report by State Intellectual Property Office, P.R. China, for app. No. 200980159934.7, dated Aug. 30, 2013.
Australian Office Action dated Feb. 21, 2014, AU Application No. 2011283037.
Office action dated Jun. 22, 2015 issued by EPO in European counterpart application No. 11812960.0 (7 pages).
Office action dated Jul. 15, 2015 issued by SIPO in counterpart Chinese patent app. No. 201110041831.X (English translation included).
Office action dated Aug. 26, 2015 issued by SIPO in counterpart Chinese patent app. No. 201180047198.3 (Concise description of relevance included).
Third Office action dated Dec. 22, 2014 from SIPO for counterpart Chinese app No. 200980159934.7. (English translation included).
Office action dated Feb. 3, 2016 issued by SIPO in counterpart Chinese patent app. No. 201110041831.X (English translation attached).
Office action dated Nov. 10, 2015 issued by SIPO in counterpart Chinese patent app. No. 200980159934.7 (English translation attached).
Rexamination Decision dated Mar. 2, 2017 issued by SIPO in counterpart Chinese patent app. No. 200980159934.7 (Concise explanation of relevance in English attached).

* cited by examiner

VIRTUAL DESKTOP SERVICES WITH AVAILABLE APPLICATIONS CUSTOMIZED ACCORDING TO USER TYPE

CROSS-REFERENCE TO RELATED APPLICATIONS

This application is a continuation of U.S. patent application Ser. No. 12/473,086 filed May 27, 2009; which claims the benefit of priority of U.S. Provisional Patent Application No. 61/169,879 filed on Apr. 16, 2009. Both of the above referenced applications are incorporated herein by reference.

BACKGROUND OF THE INVENTION (1) Field of the Invention

The present invention relates to providing access to virtual computing resources over a network.

(2) Description of the Related Art

Business travelers who travel without a laptop or who have lost use of their laptop for some reason do not typically have many options for securing computer time. One option is to avail oneself of free public access to computers at public libraries. Another is to pay for access at an office supplies store with a business center. Some hotels that specialize in business travel have dedicated business centers in which hotel guests can pay for access to desktop or laptop computers. All of these options have obvious shortcomings in terms of convenience, hours of use, peak usage availability, and customization of interfaces, e.g., personal settings.

Consider a typical business traveler arriving at a hotel for a short stay during a business trip. This person will typically require access to Internet services and other business applications during his/her stay. While these applications may well be available on the guest's own laptop computer, it may also be desirable to provide access to such services via the television in the guest's room. This would allow the guest to make use of such services without having to carry a laptop and without potentially violating usage policies for corporate IT equipment.

Unfortunately, traditional in-room entertainment facilities made available via the television (also referred to as interactive television services) do not typically provide access to a wide range of applications such as Internet browsing, business applications, or games, although recently, some of these applications have been made available in limited form. For example, an interactive TV system may provide a web browser. However, the range of web pages and the types of web content that may be accessed using such a web browser is extremely limited and certainly not representative of the most popular web sites available on the Internet today. For example, media-oriented web sites such as YouTube or News Channels do not operate correctly leaving the user unable to view online video content. In some cases the sites do not operate at all, or the video playback experience is of poor quality and often without an audio component. Additionally, the web browsing experience can often be very slow compared to the speed of browsing using a modern desktop computer. This can make use of online gaming web sites impossible or sluggish in response at best. In short, many of the most popular web sites in existence today cannot be visited by the interactive television web browsing services available today.

In addition, a wide variety of other types of applications commonly found on modern personal computers (e.g., business applications, games, social networking systems, messaging systems, etc.) are simply not offered by traditional interactive television services. This is due, at least in part, to the fact that interactive television services are often provided by a relatively low-powered set-top box in the guest room that cannot offer these types of applications because they are not able to operate within the set-top box environment (wrong operating system, not enough computing resources, etc.).

BRIEF SUMMARY OF THE INVENTION

According to the present invention, systems and methods are provided for providing virtual computing services. According to a particular class of embodiments, each of a plurality of servers is configured to instantiate and manage operation of a plurality of virtual computers running on the server. Each server is further configured to associate one or more applications running on the server with each virtual computer. Each virtual computer includes a graphic display component and an audio output component. The graphic display component is configured to generate graphic display data for the one or more associated applications. The audio output component is configured to generate audio output data for the one or more associated applications. Each server also includes one or more encoders. Each encoder is configured to encode the graphic display data and the audio output data from a corresponding one of the virtual computers for transmission over a network such that the encoded graphic display data and the encoded audio output data are synchronized. Each of a plurality of clients is configured to receive the encoded graphic display data and the encoded audio output data for an allocated one of the virtual computers via the network, and render a representation of the allocated virtual computer on the associated display. Each client includes a decoder configured to decode the encoded graphic display data and the encoded audio output data such that visible and audible components of the representation of the allocated virtual computer are substantially synchronized.

According to another class of embodiments, a plurality of virtual computers is instantiated. Each virtual computer includes a graphic display component and an audio output component. One or more applications are associated with each virtual computer. The graphic display component of each virtual computer is configured to generate graphic display data for the one or more associated applications. The audio output component of each virtual computer is configured to generate audio output data for the one or more associated applications. One of the virtual computers is allocated to a requesting client. The graphic display data and the audio output data from the allocated virtual computer are encoded for transmission over a network to the requesting client such that the encoded graphic display data and the encoded audio output data are synchronized.

According to another class of embodiments, virtual computer data representing a remote virtual computer operating on a remote platform are received. A representation of the remote virtual computer is rendered on a display using the virtual computer data. User input data are captured representing interaction of a user with the representation of the remote virtual computer. The user input data are transmitted to the remote platform on which the remote virtual computer is operating for presentation to an application associated with the remote virtual computer. A cursor representation is rendered locally for presentation with the representation of the remote virtual computer.

A further understanding of the nature and advantages of the present invention may be realized by reference to the remaining portions of the specification and the drawings.

DETAILED DESCRIPTION

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The present invention provides mechanisms which enable access to arbitrary applications via an interactive television service. According to various embodiments of the invention, such virtual desktop services are enabled by providing a pool of virtual computers, referred to herein as "virtual desktops," running on one or more servers which can be accessed, viewed, and interacted with using a display, e.g., television, and an associated client, e.g., a set top box or STB. User input (e.g., from a keyboard, an STB remote control, and/or a mouse) is captured at the user's end (e.g., by the STB) and forwarded to the server, and is used to control or otherwise interact with the virtual desktop allocated to that user. For security, this input stream may be encrypted to prevent eavesdroppers from intercepting personal data.

The virtual desktop, and any applications running on it, is rendered on the server (e.g., to a virtual graphics display and a virtual audio device) in response to the forwarded user input, and then encoded in video and audio streams using any of a variety of codecs in which synchronization of the audio and video streams may be maintained. The encoded data are forwarded to a client at the user's end, e.g., a STB, for rendering on the associated display. According to specific embodiments, the latency from user input to visual feedback on the display is kept sufficiently low that applications requiring extensive mouse or keyboard interaction are not adversely affected, e.g., below 350 milliseconds; well within the acceptable bounds for user interface response time.

A user initiates a request for allocation of a virtual desktop via the local client, e.g., using the remote control associated with a STB. Once the allocation happens, the remote server begins encoding video and audio streams generated by the allocated desktop. That is, the data generated by the virtual desktop instance that would ordinarily be employed by the video and audio hardware of a computing device are compressed into a data stream which is then transmitted over the network to the client.

According to a specific embodiment, the encoded video transmitted to the client includes high definition (HD) resolution "snapshots" of the video state of the virtual desktop taken 30 times a second. These data are synchronized with the associated audio stream and compressed using the MPEG-2 standard. However, it should be noted that virtually any suitable compression standard may be employed without departing from the scope of the invention.

According to a particular implementation, each virtual desktop instance corresponds to a nested instance of an X-Windows server process which, in turn, operates on a Linux operating system. A master X-Windows server is responsible for creating each of the nested X-Windows instances. Each nested X-Windows instance can have one or more applications running on the underlying Linux operating system that are targeted to that instance. For example, if a user interacting with a particular desktop wants to run a web browser, a virtual desktop pool manager process specifies to which X-Windows instance the output from a particular instance of the web browser should be targeted, i.e., on which virtual desktop operation of the web browser should be visible and audible.

Embodiments discussed below will assume an environment in which the client is implemented in a STB for illustrative purposes. However, references to STBs are not intended to limit the scope of the invention. Input from the user representing interactions with the virtual desktop representation on the user's television are captured by the STB using, for example, the associated remote control, or other more typical mechanisms such as a mouse or keyboard (which may be connected to USB ports on the STB or via infrared or other wireless communications links such as Bluetooth or WiFi). Events captured by the STB, e.g., mouse clicks, keyboard entries, etc., are forwarded to the server which then directs them to the virtual desktop that's been allocated to that STB. As mentioned above, the event data captured by the STB and forwarded to the server may be encrypted to ensure that the user's personal information, e.g., passwords, banking information, etc., is protected. According to some embodiments, the movements of the mouse cursor on the display are driven locally at the STB.

According to specific embodiments of the invention, the audio and video streams generated by the virtual desktop are synchronized, and this synchronization is preserved when the two streams are encoded for transmission, e.g., using MPEG-2, so that when they are rendered by the set top box on the user's television, it appears to the viewer as it would if using the applications directly on his or her laptop. According to a particular class of embodiments, the audio and video streams are captured as they are rendered in the application associated with the virtual desktop. This is not entirely straightforward in that there is typically no synchronization information available correlating the two streams. Therefore, as each stream is rendered the separate audio and video streams are captured in real time and time stamps are associated with contemporaneous data.

According to a specific embodiment, each "snapshot" of the visual graphic state of the virtual desktop is time stamped with the current time. Similarly, each audio sample is time stamped with the current time using the same reference clock. These time stamps are used by the encoder to synchronize video frames and audio samples so that they are closely synchronized when decoded and rendered by the client. So, for example, in embodiments using the MPEG-2 codec, the time stamps for the captured audio and video are used as the presentation time stamps (also known as PTS values) for the MPEG-2 encoding.

According to a particular implementation, a time stamping technique is employed that is based on a simulated clock driven by the data rate of the audio stream. That is, because we know that a given amount of audio data takes a fixed length of time to render (i.e., be made audible) we can compute the relative time stamps of successive audio captures based on the amount of data captured. Since we capture audio data much more frequently than video data, we time stamp each video capture with the last audio time stamp used. This means that video time stamps may result in a slight, but acceptable, level of temporal jitter.

Figure 1:
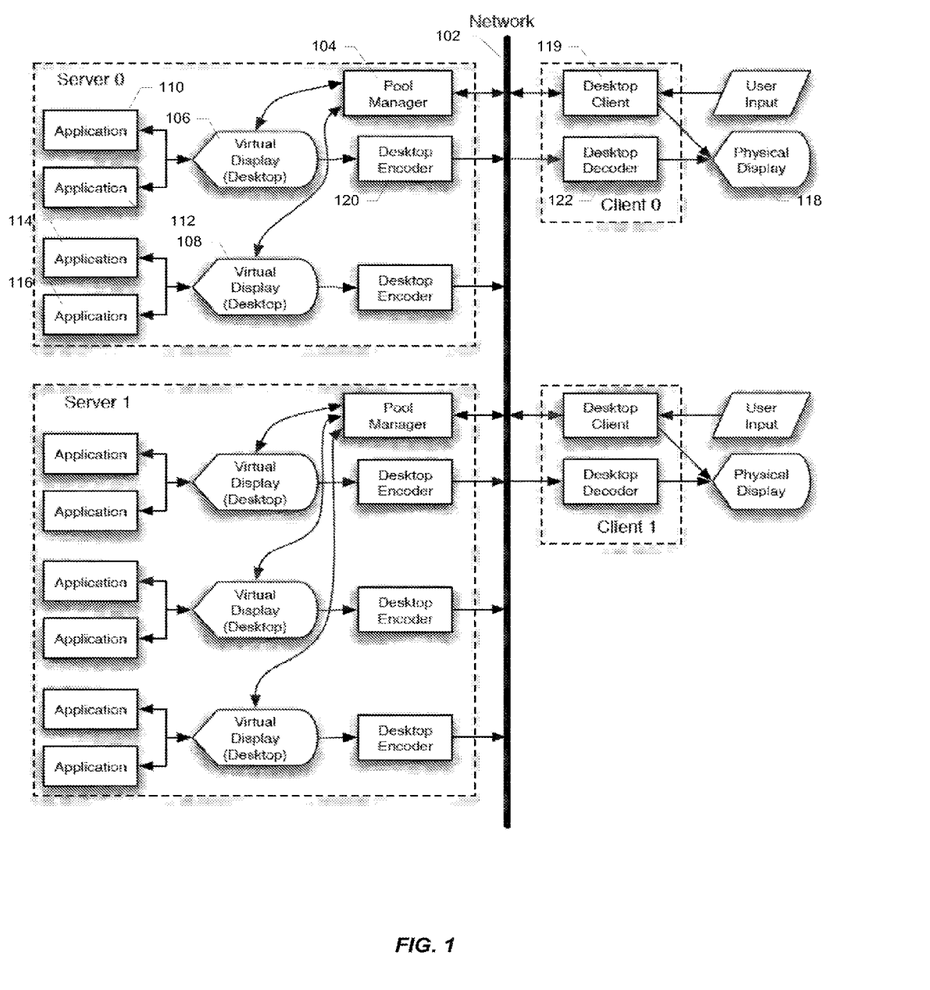
FIG. 1 is a simplified diagram of a computing environment in which embodiments of the present invention may be implemented.

FIG. 1 shows a simplified diagram of a computing network environment in which embodiments of the invention may be implemented. In this example, first client 0 is shown interacting with server 0 via network 102 to take advantage of a virtual desktop service implemented in accordance with a specific embodiment of the invention. Also shown is client 1 interacting with server 1 via network 102 for the same purpose.

Clients for use with embodiments of the invention may be implemented as software running on a STB or similar device, or may alternatively be integrated directly into a modern digital television where the manufacturer provides means to do so (e.g. Philips digital hospitality TVs). According to some embodiments, at least some of the software functionality in the client may be implemented in hardware, e.g., the decoder.

According to a specific embodiment, servers 0 and 1 are X-Windows servers running on Linux operating systems, and clients 0 and 1 are set top boxes (STBs) capable of providing interactive television (ITV) services such as, for example, STBs from ETV Interactive Ltd. of Stirling, Scotland (acquired by iBAHN of Salt Lake City, Utah, in 2007).

Embodiments of the present invention may be implemented in any interactive television system including, for example, cable television systems, satellite television systems, etc. Thus, the clients and servers, as well as the communication protocols, in such systems would be implemented in accordance with the appropriate standards for those contexts. In addition, the nature of network 102 may vary considerably depending on the context. For example, network 102 may be any network that is capable of carrying both video and IP (Internet Protocol) data. This could be, for example, an IPTV network based on Ethernet or over DSL lines, a Hybrid Fiber Coax network with IP-capable return path such as that used by modern cable TV operators, a satellite television network, a telecommunications network, or a combination of any of these. For example, a satellite television network may employ a combination including a satellite link for transmitting audio and video data to the user's set top box, and some other path (e.g., a phone line) for providing the IP data. Such combination "networks" are expressly contemplated as being within the scope of the invention. And as will be understood, an arbitrary number of servers may provide virtual desktop services to an arbitrary number of clients in accordance with such embodiments. For illustrative purposes, the following description will focus on the interaction between client 0 and server 0.

When a server in the system (e.g., server 0) initially starts up, a Pool Manager 104 is executed which reads a configuration file to determine how many virtual desktop instances (e.g., 106 and 108) to create. According to a specific embodiment, each virtual desktop includes a virtual representation of a graphic display, e.g., an instance of an X-Windows server process, i.e., an open source implementation provided by the X.Org Project (www.x.org). Each virtual desktop also includes a virtual representation of an audio output device (also referred to as an audio sink), e.g., a PulseAudio sound server (see http://pulseaudio.org/).

When an application associated with the virtual desktop (e.g., applications 110-116) needs to render video and/or audio output, it renders them to these two components of the virtual desktop with which it is associated. Pool manager 104 associates each application running on the server (e.g., application 110-116) with a particular virtual desktop (e.g., 106 or 108) by setting environment variables which tell each application which graphic display and which audio sync it should use.

A window manager application (not shown) is employed to manage display of and interaction with windows associated with each X-Windows instance. A specific set of default applications (e.g., applications 110-116) may be associated with each virtual desktop. Such applications include virtually any type of application that may be deployed on a standard personal computer or mobile computing device including, but not limited to, web browsers, business applications, word processing applications, game applications, etc.

According to some embodiments, a default set of applications associated with a particular virtual desktop could be directed to the needs or preferences of a particular type of user. For example, a standard set of business applications could be made available on a business-oriented virtual desktop. Alternatively, a set of entertainment and game applications could be made available on an entertainment virtual desktop. As will be understood, the types of applications and potential application sets are virtually limitless.

The virtual desktop instances are kept in a "free" pool of unused virtual desktops for servicing requests. Pool Manager 104 then "listens" to the network traffic looking for requests for virtual desktop services. If all available virtual desktops are in use, additional virtual desktops instances may be created by Pool Manager 104 up to some maximum programmable limit. In addition, if there are too many available virtual desktops operating on the server, Pool Manager 104 may shut some down to conserve computing resources.

Figure 2:
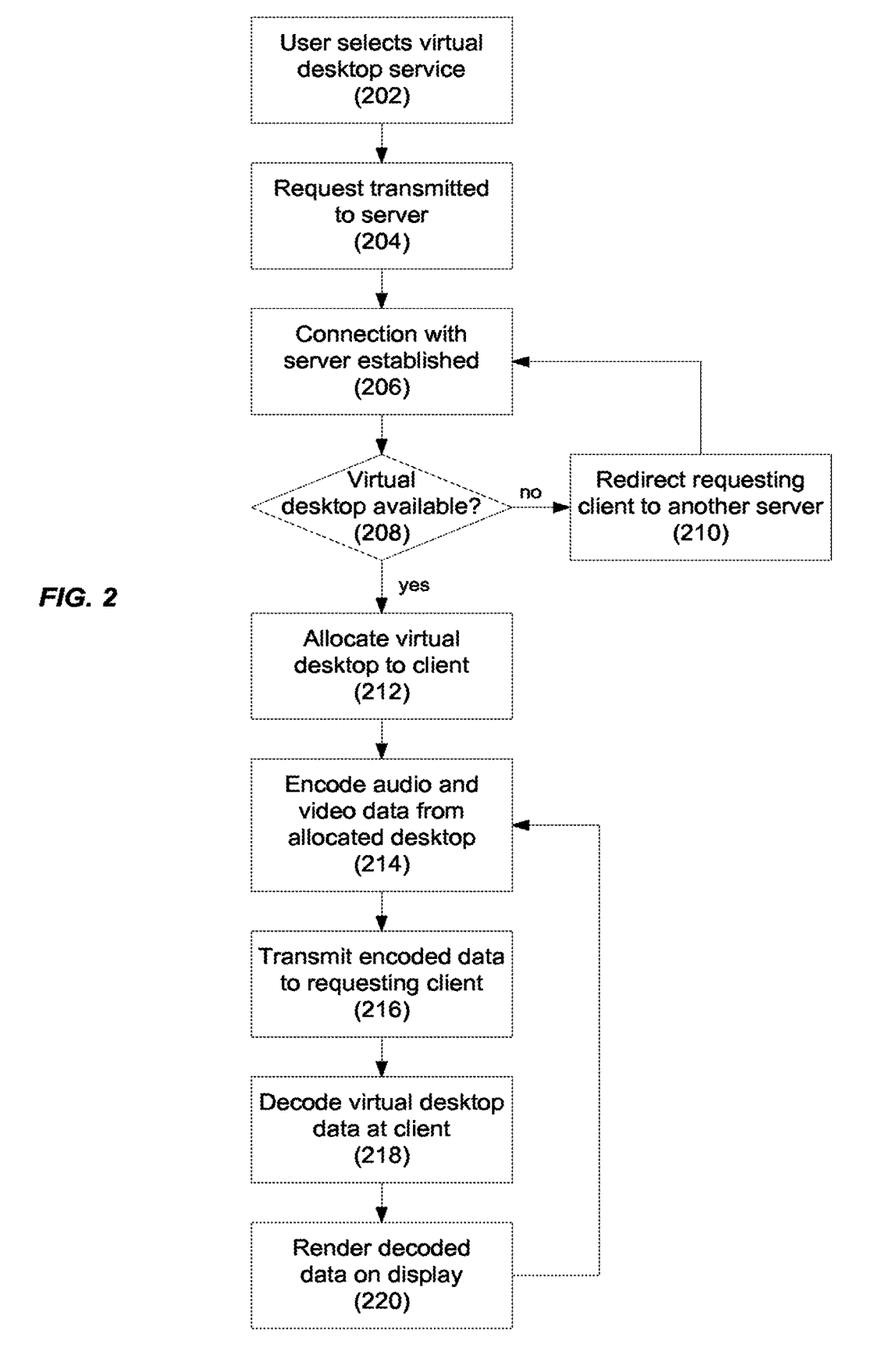
FIG. 2 is a flowchart illustrating operation of a specific embodiment of the invention.

When a user associated with client device 0 wishes to take advantage of a virtual desktop service, he may select that option via an interactive menu rendered on physical display 118 (e.g., a television) by client 0 using, for example, a remote control (not shown) configured to interact with client 0. As mentioned above, client 0 may be a stand-alone STB or similar device configured to facilitate ITV services. Alternatively, client 0 may be integrated with television 118. An example of the operation of a particular embodiment is illustrated in the flowchart of FIG. 2.

In response to selection of the virtual desktop service by the user (202), desktop client 119 in client 0 transmits a request to one of the plurality of servers deployed on network 102 that are configured to provide such services (204). According to a particular implementation, desktop client 119 selects (e.g., randomly, sequentially, or otherwise) from a list of known servers until it can establish a connection (206). In this way, one or more virtual desktop servers may be taken offline while still providing virtual desktop services.

Once the connection is made, Pool Manager 104 may service desktop client 119's request or, if there are no available virtual desktops on server 0 (208), Pool Manager 104 may redirect the client to another server that has available virtual desktops, e.g., server 1 (210). That is, each Pool Manager in the system maintains a list of virtual desktops available on other servers. Load balancing mechanisms may also be implemented to ensure that the load associated with providing virtual desktop services is efficiently divided among available computing resources.

Assuming that desktop client 119's request may be locally serviced (208), Pool Manager 104 allocates one of its available virtual desktops (e.g., virtual desktop 106) to client 0 (212). As a result of the allocation, the audio and video streams generated by virtual desktop 106 are encoded by desktop encoder 120 (214), and transmitted to client 0 (216) for decoding by desktop decoder 122 (218), and rendering on television 118 (220). Desktop encoder 120 is instantiated as a result of the allocation.

According to various embodiments, desktop encoder 120 and desktop decoder 122 may employ any of a wide variety of encoding schemes to encode and decode the audio and video streams for the virtual desktop as long as the encoding scheme employed allows for synchronization between the audio and video to be maintained. It is also important to note that care should be taken to ensure that the capturing and encoding of the video stream is performed in synchrony with the virtual display updates to avoid the appearance of "video tearing" at the user's display due to partially rendered application output. Examples of suitable codecs include, but are not limited to, H.263, H.264, MPEG-2, MPEG-4, etc. According to a specific embodiment, the audio and video streams are encoded using MPEG-2, a standard employed by the hardware in many currently available digital televisions and STBs. It will be understood, however, that other suitable alternatives are within the scope of the invention.

When the representation of a virtual desktop is rendered on the requesting user's television by client 0, one or more of the applications associated with that virtual desktop (e.g., applications 110 and 112) may be shown as open and running. Alternatively, the user may be presented with an interface having application icons with which the user may launch such applications. In some instances, the former approach may be desirable in that providing fewer options for the user may allow for more robust and secure system operation.

Figure 3:
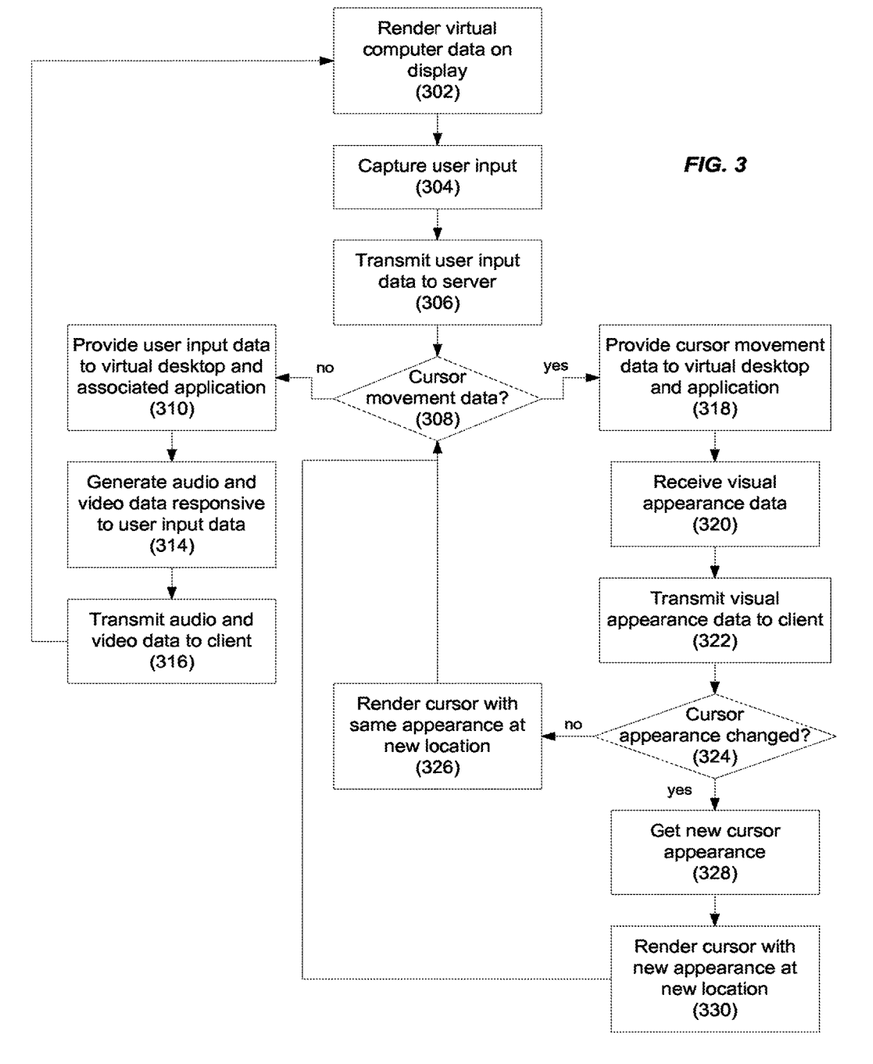
FIG. 3 is a flowchart illustrating operation of a specific embodiment of the invention.

The manner in which a user's interactions with a virtual desktop may be handled in accordance with specific embodiments of the invention may be understood with reference to the flowchart of FIG. 3. Referring back to FIG. 1, the encoded and compressed audio and video data are decoded by desktop decoder 122 and rendered on display 118 at some applicable frame rate, e.g., 25 or 30 frames per second (302). Each frame represents a "snapshot" of the graphic state of virtual desktop 106. The decoded audio (e.g., sampled at 44.1 kHz) is presented over the speaker(s) or headphones associated with display 118.

User interaction with the virtual desktop may be captured from a variety of devices such as, for example, the STB remote control, any of a variety of cursor control devices (e.g., a mouse, a joystick, etc.), a keyboard, a camera, a game controller, a microphone, etc. (304). These inputs are transmitted by desktop client 119 to pool manager 104 (306) which, if the inputs are not merely cursor movements (308), provides user input information to the allocated virtual desktop, in this example, virtual desktop 106, which is then provided to the application (e.g., 110 or 112) with which the user is interacting (310), resulting in a corresponding change to the graphic representation and/or audio sync (314) which is then propagated back to the client (316) to be rendered in the manner described above. The types of user inputs that are handled in this manner are inputs that effect a change in the state of the underlying application with which the user is interacting, e.g., mouse clicks, keyboard input, etc.

According to a particular class of implementations, the cursor depicted in the virtual desktop image on the user's television is rendered locally by the associated client. That is, when desktop client 119 receives input corresponding to movement of the cursor (304), i.e., a cursor movement event, it sends the event information on to pool manager 104 (306) as described above for other types of input. However, the input is handled differently for cursor movements. In this case (308), pool manager 104 provides the movement and location to the underlying application via virtual desktop 106 (318). The virtual desktop responds to the pool manager regarding the shape and appearance of the cursor based on the new location (320). Pool manager 104 then responds back to desktop client 119 regarding the shape and appearance of the cursor (322). If the response from pool manager 104 indicates that the shape and appearance of the cursor have not changed (324), desktop client 119 renders the cursor locally on physical display 118 at the new location and having the same appearance (326).

On the other hand, if virtual desktop 106 indicates to pool manager 104 that the cursor has changed (324) (i.e., because of its new location in the graphic representation of the underlying application), the pool manager sends the new appearance of the cursor to desktop client 119 (e.g., with the same communication or in response to a request from the client) (328) which again renders the cursor locally on physical display 118 at the new location, but with the new appearance (330). Using this "sideband channel," cursor movement is not subject to the full latency associated with the pathway through encoder 120 and decoder 122, but the correct appearance of the cursor with respect to the underlying application is still maintained.

According to some implementations, the cursor movement is rendered immediately by the desktop client while the cursor appearance is being negotiated with the pool manager in the background. This keeps the cursor motion responsive while the shape update happens via the sideband channel. Once the new cursor shape is known, it is immediately updated on screen whether the cursor has moved again or not. Since the time delay involved is minimal, the user typically will not notice if the wrong cursor appearance has been rendered briefly.

According to some embodiments, mechanisms may be provided by which a user may connect peripheral devices to the system. That is, USB ports or other suitable connectors, may be provided in association with the client (e.g., on the STB or an associated device such as an auxiliary panel) to which the user may connect his own personal peripheral devices just as he would to his own personal computer. For example, the user could connect a memory device (e.g., a USB drive, a memory stick etc.), a music player (an iPod or the like), a digital camera, a portable printer, etc.

In the example system shown in FIG. 1, desktop client 119 would detect the connection of the peripheral device and communicate that information to pool manager 104. Pool manager 104 could then create a local virtual instance of the peripheral device on server 0 so that the application with which the user is interacting can communicate with the remote physical peripheral device via the local virtual instance of that device. These communications would be conducted as a series of requests and responses via another "sideband channel" through pool manager 104 and desktop client 119. Alternatively, these communications could be conducted via such a sideband channel between the physical device and the application without creation of a virtual instance on the server side. In this way, the user can upload and download files and data to his personal peripheral devices just as he would with his own personal computer.

Among the advantages of some implementations is the fact that a virtual desktop can be available on demand to any guest in any room in a hotel. Not only is this convenient to the user (i.e., no need to leave one's room or wait for computers to become available), it also obviates the need to dedicate physical resources (both in terms of property square footage as well as hardware) to the creation and maintenance of a business center. As many virtual desktops as are required at any given time may be provided simply by creating an additional instance for each request.

In addition, embodiments of the invention have the advantage that audio and video are well synchronized. This is particularly important when a user is consuming multimedia content via the Web. Lack of synchronization is completely unacceptable to users when viewing video clips available, for example, from YouTube or similar content providers.

Moreover, the recent widespread deployment of high definition (HD) televisions and displays has helped to make embodiments of the present invention commercially viable. That is, the resolution of standard definition (SD) televisions (e.g., 720.times.576 or 720.times.480) and displays is such that the appearance of the typically more high resolution computer interfaces (e.g., 1024.times.768) appears grainy and unappealing when rendered in SD. Many web pages, for example, are not designed for viewing on anything less than an 800.times.600 screen. By contrast, the resolution of HD devices (e.g., 1280.times.720 or 1920.times.1080) is more than sufficient to render computer interfaces in a clear and appealing manner.

Embodiments of the invention also enable the ability to provide customized computing resources and applications for individual users and/or organizations. For example, different types of virtual desktops customized in various ways may be provided for different types of users. A business desktop could be provided which includes standard business or office applications, e.g., word processing, spreadsheets, presentation creation, etc. An entertainment desktop could be provided which includes various types of game software. Implementations in particular contexts might provide applications and/or engines which are specific to that context, e.g., a travel service booking engine in a hospitality context. Custom settings, preferences, applications sets, etc., may also be stored and provided in a virtual desktop for particular users so that each user's experience is correspondingly enhanced and/or policies for a user's organization are complied with.

While the invention has been particularly shown and described with reference to specific embodiments thereof, it will be understood by those skilled in the art that changes in the form and details of the disclosed embodiments may be made without departing from the spirit or scope of the invention. For example, references have been made herein to the context of the hospitality industry in which embodiments of the invention may be implemented to provide virtual desktop services to hotel guests. However, it will be understood that the invention is not limited to such a context. Rather, embodiments of the present invention may be implemented in any context in which interactive television services may be provided. Thus, for example, virtual desktop services implemented in accordance with the invention may be provided in both cable television and satellite television systems.

In addition, the functionality described herein may be implemented in a wide variety of ways without departing from the scope of the invention. For example, functionalities described herein may be implemented using computer program instructions stored in physical memory, e.g., any type of RAM or ROM, associated with the particular computing devices performing the described functions. Any of the various computing and programming tools and languages known to those of skill in the art which may be adapted for such purposes are within the scope of the present invention. Alternatively, at least some of the described functionality may be implemented using other types of hardware such as, for example, programmable logic devices, field-programmable gate arrays, application-specific integrated circuits, and the like. Again, suitable alternatives will be apparent to those of skill in the art.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system for providing virtual computing services, the system comprising:
   one or more servers operable to instantiate and manage operation of a plurality of virtual computers of different types, each server being operable to associate a set of one or more applications running on the server with each virtual computer, wherein the set of one or more applications that is associated with virtual computers of different types are different from one another in order to service different types of users operating the virtual computers, wherein the one or more servers are operable to receive from a particular client a request for allocation of a virtual computer according to a preference of a user operating the particular client, and to allocate a particular type of virtual computer to the particular client in response to the request, the particular type of the virtual computer allocated to the particular client being directed to the preference, each virtual computer comprising a graphic display component and an audio output component, the graphic display component being operable to generate graphic display data for the one or more associated applications, the audio output component being operable to generate audio output data for the one or more associated applications, each server also comprising one or more encoders, each encoder being operable to encode the graphic display data and the audio output data from a corresponding one of the virtual computers for transmission over a network such that the encoded graphic display data and the encoded audio output data are synchronized; and
   a plurality of clients each respectively coupled with an associated display, each client being operable to display an interactive menu on the associated display of the client, the interactive menu allowing a user of the client to request virtual computer allocation, each client being operable to transmit the request for virtual computer allocation to the one or more servers, receive the encoded graphic display data and the encoded audio output data for an allocated one of the virtual computers via the network, and render a representation of the allocated virtual computer on the associated display, each client comprising a decoder operable to decode the encoded graphic display data and the encoded audio output data such that visible and audible components of the representation of the allocated virtual computer are substantially synchronized;

wherein at least one of the encoders employs a codec that is operable to employ a plurality of time stamps associated with the graphic display data and the audio output data to encode the graphic display data and the audio output data;

the time stamps associated with the graphic display data and the audio output data are derived at the at least one of the encoders from a simulated reference clock;

the at least one of the encoders is operable to drive the simulated reference clock according to a data rate of the audio stream by computing relative time stamps of successive audio captures of a fixed amount of audio data captured; and the at least one of the encoders is further operable to time stamp each video capture with a last audio time stamp used.

2. The system of claim 1 wherein each client is implemented in a set top box operable to provide interactive television services on the associated display.

3. The system of claim 2 wherein the network comprises one or more of an IP-based transmission infrastructure, a coaxial cable transmission infrastructure, a satellite communication infrastructure, or a telecommunications infrastructure.

4. The system of claim 1 wherein each client is further operable to capture user input data representing interaction of a user with the representation of the allocated virtual computer, and to transmit the user input data to a first one of the servers managing the allocated virtual computer, the first server being operable to provide the user input data to the one or more applications associated with the allocated virtual computer.

5. The system of claim 4 wherein the user input data are generated by one or more of a keyboard, a mouse, a remote control, a game controller, a joystick, a camera, or a microphone.

6. The system of claim 4 wherein the representation of the allocated virtual computer rendered by each client includes a cursor representation, each client being operable to render the cursor representation locally.

7. The system of claim 6 wherein the first server is further operable to identify a visual appearance for the cursor representation relative to the one or more applications in conjunction with providing the user input data to the one or more applications associated with the allocated virtual computer, and to communicate the visual appearance to a first one of the clients corresponding to the allocated virtual computer, the first client being operable to render the cursor representation to have the visual appearance.

8. The system of claim 1 wherein each client is integrated with the associated display.

9. The system of claim 1, wherein the one or more servers are further operable to:
instantiate a pool of available virtual computers; and
select an unused virtual computer from the pool for allocation to the particular client in response to receiving the request from the particular client.

10. A computer-implemented method for providing virtual computing services, the method comprising:
instantiating a plurality of virtual computers of different types, each virtual computer comprising a graphic display component and an audio output component;
associating a set of one or more applications with each of the virtual computers, wherein the set of one or more applications that is associated with virtual computers of different types are different from one another in order to service different types of users operating the virtual computers;
receive from a requesting client a request for allocation of a virtual computer according to a preference of a user operating the requesting client;
allocating a particular virtual computer of a particular type to the requesting client in response to the request, the particular type of the particular virtual computer being directed to the preference;
generating graphic display data for the set of one or more associated applications by the graphic display component of the particular virtual computer, and generating audio output data for the set of one or more applications by the audio output component of the particular virtual computer;
encoding the graphic display data and the audio output data from the particular virtual computer for transmission over a network to the requesting client such that the encoded graphic display data and the encoded audio output data are synchronized;
employing a codec that is operable to employ a plurality of time stamps associated with the graphic display data and the audio output data while encoding the graphic display data and the audio output data;
deriving the time stamps associated with the graphic display data and the audio output data from a simulated reference clock;
driving the simulated reference clock according to a data rate of the audio stream by computing relative time stamps of successive audio captures of a fixed amount of audio data captured; and
time stamping each video capture with a last audio time stamp used.

11. The method of claim 10 wherein the network comprises one or more of an IP-based transmission infrastructure, a coaxial cable transmission infrastructure, a satellite communication infrastructure, or a telecommunications infrastructure.

12. The method of claim 10 further comprising:
receiving user input data representing interaction of a user with a representation of the particular virtual computer; and
providing the user input data to the one or more applications associated with the particular virtual computer.

13. The method of claim 12 further comprising:
identifying a visual appearance for a cursor representation relative to the one or more applications in conjunction with providing the user input data to the one or more applications associated with the particular virtual computer; and
communicating the visual appearance to the requesting client for local rendering of the cursor representation by the requesting client.

14. The method of claim 10, further comprising:
instantiating a pool of available virtual computers; and
selecting an unused virtual computer from the pool for allocation to the requesting client in response to receiving the request from the requesting client.

15. The method of claim 10, wherein each client is implemented in a set top box operable to provide interactive television services on the associated display.

16. A non-transitory computer-readable medium comprising computer executable instructions that when executed by a computer cause the computer to provide virtual computing services, the non-transitory computer-readable medium comprising instructions for:

instantiating a plurality of virtual computers of different types, each virtual computer comprising a graphic display component and an audio output component;

associating a set of one or more applications with each of the virtual computers, wherein the set of one or more applications that is associated with virtual computers of different types are different from one another in order to service different types of users operating the virtual computers;

receive from a requesting client a request for allocation of a virtual computer according to a preference of a user operating the requesting client;

allocating a particular virtual computer of a particular type to the requesting client in response to the request, the particular type of the particular virtual computer being directed to the preference;

generating graphic display data for the set of one or more associated applications by the graphic display component of the particular virtual computer, and generating audio output data for the set of one or more applications by the audio output component of the particular virtual computer;

encoding the graphic display data and the audio output data from the particular virtual computer for transmission over a network to the requesting client such that the encoded graphic display data and the encoded audio output data are synchronized;

employing a codec that is operable to employ a plurality of time stamps associated with the graphic display data and the audio output data while encoding the graphic display data and the audio output data;

deriving the time stamps associated with the graphic display data and the audio output data from a simulated reference clock;

driving the simulated reference clock according to a data rate of the audio stream by computing relative time stamps of successive audio captures of a fixed amount of audio data captured; and time stamping each video capture with a last audio time stamp used.

17. The non-transitory computer-readable medium of claim 16, wherein the method further comprises:

instantiating a pool of available virtual computers; and selecting an unused virtual computer from the pool for allocation to the requesting client in response to receiving the request from the requesting client.

18. The non-transitory computer-readable medium of claim 16, wherein the network comprises one or more of an IP-based transmission infrastructure, a coaxial cable transmission infrastructure, a satellite communication infrastructure, or a telecommunications infrastructure.

19. The non-transitory computer-readable medium of claim 16, wherein the non-transitory computer-readable medium further comprises instructions for:

receiving user input data representing interaction of the user with a representation of the particular virtual computer; and providing the user input data to the one or more applications associated with the particular virtual computer.

20. The non-transitory computer-readable medium of claim 16, wherein the non-transitory computer-readable medium further comprises instructions for:

identifying a visual appearance for a cursor representation relative to the one or more applications in conjunction with providing the user input data to the one or more applications associated with the particular virtual computer; and communicating the visual appearance to the requesting client for local rendering of the cursor representation by the requesting client.

* * * * *